US009002511B1

(12) United States Patent
Hickerson et al.

(10) Patent No.: US 9,002,511 B1
(45) Date of Patent: Apr. 7, 2015

(54) METHODS AND SYSTEMS FOR OBSTACLE DETECTION USING STRUCTURED LIGHT

(75) Inventors: Kevin Hickerson, Altadena, CA (US);
Luis Goncalves, Pasadena, CA (US);
Paolo Pirjanian, Glendale, CA (US);
Nikolai Romanov, Oak Park, CA (US)

(73) Assignee: iRobot Corporation, Bedford, MA (US)

( * ) Notice: Subject to any disclaimer, the term of this patent is extended or adjusted under 35 U.S.C. 154(b) by 1179 days.

(21) Appl. No.: 11/584,355

(22) Filed: Oct. 20, 2006

Related U.S. Application Data

(60) Provisional application No. 60/729,402, filed on Oct. 21, 2005.

(51) Int. Cl.
*G06F 15/00* (2006.01)
*G06F 13/376* (2006.01)
*G05D 1/02* (2006.01)

(52) U.S. Cl.
CPC ............ *G05D 1/0246* (2013.01); *G05D 1/0253* (2013.01)

(58) Field of Classification Search
USPC ......................................................... 700/245
See application file for complete search history.

(56) References Cited

U.S. PATENT DOCUMENTS

| 3,785,262 | A | * | 1/1974 | Stroke ............................ 396/333 |
| 4,675,502 | A | * | 6/1987 | Haefner et al. .......... 219/124.34 |
| 4,710,020 | A | | 12/1987 | Maddox et al. |
| 4,846,297 | A | | 7/1989 | Field et al. |
| 4,954,962 | A | * | 9/1990 | Evans et al. ..................... 701/28 |
| 4,965,442 | A | * | 10/1990 | Girod et al. ................. 250/201.7 |
| 5,002,501 | A | | 3/1991 | Tucker |
| 5,016,173 | A | * | 5/1991 | Kenet et al. .................... 382/128 |
| 5,040,116 | A | * | 8/1991 | Evans et al. ..................... 701/28 |
| 5,155,684 | A | | 10/1992 | Burke et al. |
| 5,258,822 | A | | 11/1993 | Nakamura et al. |

(Continued)

FOREIGN PATENT DOCUMENTS

| DE | 4338841 | A1 | 5/1995 |
| EP | 0479273 | A | 4/1992 |

(Continued)

OTHER PUBLICATIONS

Becker, C. et al.; "Reliable navigation using landmarks," Robotics and Automation, 1995. Proceedings, 1995 IEEE International Conference on Robotics and Automation vol. 1, May 21-27, 1995 pp. 401-406.

(Continued)

*Primary Examiner* — John Q Nguyen
*Assistant Examiner* — Kyung Kim
(74) *Attorney, Agent, or Firm* — Knobbe, Martens, Olson & Bear LLP

(57) ABSTRACT

An obstacle detector for a mobile robot while the robot is in motion is disclosed. The detector preferably includes at least one light source configured to project pulsed light in the path of the robot; a visual sensor for capturing a plurality of images of light reflected from the path of the robot; a processing unit configured to extract the reflections from the images; and an obstacle detection unit configured to detect an obstacle in the path of the robot based on the extracted reflections. In the preferred embodiment, the reflections of the projected light are extracted by subtracting pairs of images in which each pair includes a first image captured with the at least one light source on and a second image captured with the at least one light source off, and then combining images of two or more extracted reflections to suppress the background.

24 Claims, 5 Drawing Sheets

(56) References Cited

U.S. PATENT DOCUMENTS

| | | | |
|---|---|---|---|
| 5,831,717 A * | 11/1998 | Ikebuchi | 356/4.01 |
| 5,844,232 A | 12/1998 | Pezant | |
| 5,940,170 A | 8/1999 | Berg et al. | |
| 6,028,671 A * | 2/2000 | Svetkoff et al. | 356/368 |
| 6,072,903 A * | 6/2000 | Maki et al. | 382/190 |
| 6,101,455 A * | 8/2000 | Davis | 702/94 |
| 6,278,917 B1 | 8/2001 | Bauer et al. | |
| 6,389,329 B1 | 5/2002 | Colens | |
| 6,459,955 B1 | 10/2002 | Bartsch et al. | |
| 6,504,610 B1 | 1/2003 | Bauer et al. | |
| 6,629,028 B2 | 9/2003 | Paromtchik et al. | |
| 6,654,482 B1 | 11/2003 | Parent et al. | |
| 6,781,541 B1 * | 8/2004 | Cho | 342/25 D |
| 6,906,702 B1 | 6/2005 | Tanaka et al. | |
| 7,069,124 B1 | 6/2006 | Whittaker et al. | |
| 7,075,661 B2 | 7/2006 | Petty et al. | |
| 7,720,554 B2 | 5/2010 | DiBeranrdo et al. | |
| 7,996,097 B2 | 8/2011 | DiBernardo et al. | |
| 8,295,955 B2 | 10/2012 | DiBernardo et al. | |
| 8,380,350 B2 | 2/2013 | Ozick et al. | |
| 8,396,592 B2 | 3/2013 | Jones et al. | |
| 8,412,377 B2 | 4/2013 | Casey et al. | |
| 8,428,778 B2 | 4/2013 | Landry et al. | |
| 2001/0013929 A1 | 8/2001 | Torsten | |
| 2001/0048763 A1 * | 12/2001 | Takatsuka et al. | 382/154 |
| 2002/0016649 A1 | 2/2002 | Jones | |
| 2002/0104963 A1 | 8/2002 | Mancevski | |
| 2002/0159051 A1 | 10/2002 | Guo | |
| 2003/0058262 A1 | 3/2003 | Sato et al. | |
| 2003/0193657 A1 | 10/2003 | Uomori et al. | |
| 2003/0208304 A1 | 11/2003 | Peless et al. | |
| 2003/0210329 A1 * | 11/2003 | Aagaard et al. | 348/159 |
| 2003/0229441 A1 * | 12/2003 | Pechatnikov et al. | 701/201 |
| 2003/0233870 A1 | 12/2003 | Mancevski | |
| 2004/0125461 A1 | 7/2004 | Kawamura | |
| 2005/0000543 A1 | 1/2005 | Taylor et al. | |
| 2005/0010330 A1 | 1/2005 | Abramson et al. | |
| 2005/0033124 A1 | 2/2005 | Kelly et al. | |
| 2005/0150697 A1 * | 7/2005 | Altman et al. | 178/19.02 |
| 2005/0213109 A1 | 9/2005 | Schell et al. | |
| 2006/0018516 A1 * | 1/2006 | Masoud et al. | 382/115 |
| 2006/0018539 A1 * | 1/2006 | Sato et al. | 382/173 |
| 2007/0045018 A1 | 3/2007 | Carter et al. | |
| 2007/0258706 A1 * | 11/2007 | Raskar et al. | 396/52 |
| 2008/0297360 A1 * | 12/2008 | Knox et al. | 340/628 |
| 2011/0125323 A1 | 5/2011 | Gutmann et al. | |
| 2013/0245937 A1 | 9/2013 | DiBernardo et al. | |

FOREIGN PATENT DOCUMENTS

| | | |
|---|---|---|
| EP | 0 798 567 | 10/1997 |
| EP | 0294101 A | 12/1998 |
| FR | 2601443 A | 1/1998 |
| GB | 2284957 A | 6/1995 |
| JP | 59-112311 A | 6/1984 |
| JP | 59184917 A | 10/1984 |
| JP | 60089213 A | 5/1985 |
| JP | 05257527 A | 10/1993 |
| JP | 05285861 A1 | 11/1993 |
| JP | 10-27018 | 1/1998 |
| JP | 2001-522079 | 11/2001 |
| JP | 2002-82720 | 3/2002 |
| JP | 2003-515210 | 4/2003 |
| WO | WO 99/23543 | 5/1999 |
| WO | WO 01/37060 | 5/2001 |

OTHER PUBLICATIONS

International Search Report for PCT/US05/010200, dated Aug. 2, 2005.

International Search Report for PCT/US05/010244, dated Aug. 2, 2005.

Japanese Office Action, JP Patent Application No. 2007-506413, dated May 26, 2010, English Translation and Japanese Office Action.

\* cited by examiner

METHODS AND SYSTEMS FOR OBSTACLE DETECTION USING STRUCTURED LIGHT

CROSS-REFERENCE TO RELATED APPLICATION

This application claims the benefit of U.S. Provisional Patent Application Ser. No. 60/729,402 filed Oct. 21, 2005, entitled "METHODS AND SYSTEMS FOR OBSTACLE DETECTION USING STRUCTURED LIGHT," which is hereby incorporated by reference herein for all purposes.

FIELD OF INVENTION

This disclosure presents a system and method through which a mobile device, such as a robot, can detect obstacles while navigating in an environment using a laser pattern to augment the visible field of a visual sensor and measure the distance to objects.

DESCRIPTION OF RELATED ART

To create a robust collision detection system, an algorithmic approach using only a video feed is unlikely to detect all near-field objects with a reliability preferred for robotic navigation.

Automatic obstacle detection is a useful functionality for a mobile device that navigates in an environment. For fully autonomous devices, automatic obstacle detection enables the device to move within an environment without damaging objects and without getting caught, pinned, jammed, or trapped. For a semi-autonomous device, such as tele-operated vehicle, automatic obstacle detection can facilitate the tele-operated control of the vehicle by either alerting a human operator to the presence of obstacles or by adapting the operator's commands in order to avoid collisions with detected obstacles.

There are several known methods for automatic obstacle detection. One conventional method for obstacle detection uses a laser range finder. In a laser range finder, a laser beam is pulsed, and the time required to receive the reflection of the pulse is proportional to the distance to an obstacle. The laser and detector are typically mounted on a rotating platform so that a scan of the environment can be performed. Typical scan rates are 10 scans per second, with 360 or more points scanned per rotation. The accuracy is also relatively high, with the estimated distance to an obstacle typically detected with accuracy better than 1 cm and with a range of up to 80 meters. Despite the relatively high quality of the data, the device is relatively expensive, precluding its use in many products. Furthermore, the scan is done only in one plane (typically a horizontal plane if the laser range finder is horizontally mounted); thus, the sensor is unable to detect objects that do not lie in the scan plane (such as a tabletop).

Another conventional method for obstacle detection uses infrared (IR) sensors. An IR sensor typically comprises an IR light-emitting diode (LED) illumination source with a lens so as to project the light in a thin, pencil-like beam, and a photosensitive detector that is aligned with the illuminator. The detector is typically a one-dimensional (1-D) array, and given the position along the 1-D array where the illumination is detected, the distance to an obstacle can be calculated. IR sensors typically have a range on the order of 1 meter. Because IR sensors only provide detection along the pencil-like beam, it is, disadvantageously, relatively difficult to obtain complete coverage of the environment, even when a relatively large number of IR sensors, such as dozens of IR sensors, are used.

Another conventional method for obstacle detection uses ultrasound sensors. In an ultrasound sensor, an emitter of ultrasonic sound generates an ultrasonic sound pulse. The time it takes to receive the reflected echo is proportional to the distance to the obstacle. Ultrasound typically has a range of up to 8 meters, and a single detector can typically cover a cone of approximately 30 degrees. However, using ultrasound sensors, it is relatively difficult to localize an object precisely, to disambiguate between various objects at different distances, and to disambiguate echoes from true objects.

There are several conventional approaches to obstacle detection in which the sensor used is a 2-dimensional visual sensor such as that of a CCD camera, and the techniques used are those of computer vision or machine vision, wherein the image produced is analyzed in one of several ways. One vision-based approach uses stereo vision. In the stereo vision approach, images of the environment are taken by two or more sensors among which the relative positioning is known. By finding pixel correspondence among the multiple views of features in the environment, the pixel coordinates can be triangulated to determine the 3-D location of the detected features. A challenging part of this process is determining the correct correspondences of features seen in one image with what is seen in other images. This is a relatively computationally intensive process, which can often produce inaccurate results, particularly when the environment being imaged has relatively little texture (i.e., features, or points that can easily be identified across images).

Another conventional vision-based approach uses a technique known as structure from motion. This method is a variant of the stereo vision method, in which instead of using images from different imagers that are spatially co-located, images from the same imager taken at different instances in time as the mobile device moves through the environment are utilized. The method of detecting corresponding image points and the method of triangulation are the same as in stereo vision, but the problem is made more difficult because the spatial co-location of the imager when the images were acquired is, a priori, not known. Even if the motion of the mobile device is somehow measured, it is typically not known with sufficient accuracy to enable accurate triangulation. The solution to this problem is typically known in the computer vision community as the "Structure from Motion" problem, and several standard techniques have been developed to solve it. The overall method is of comparable computational cost and complexity as the stereo vision method, and the method suffers from the same drawback, in that it typically does not provide reliable and complete estimates when there is insufficient texture in the environment.

Another variety of vision-based approaches use structured light. This method overcomes the possibility that there are not enough features in the environment by using a dedicated light source to generate visible features in the environment. The light source can be a simple point source, such as a laser beam or a focused LED beam, can be a stripe of light, or can be any other fixed projection pattern. Typically, the relative position of the illumination source to the imager is known, so that once a point from the illumination pattern is detected, the 3-D position of the obstacle on which the illumination pattern point was detected can be triangulated. One challenge of this method is to reliably detect the illumination pattern. A typical difficulty is that the pattern must remain visible to the imager even in the presence of other light sources, such as the sun in the case of an outdoor environment. There are several known approaches to improve or maximize the visibility of the pattern.

In one approach for improving or maximizing the visibility of a structured light pattern, the illumination source can be made very bright, so that it is not washed out by other sources. In some applications this may not be feasible, due to power considerations or due restrictions on illumination intensity required by eye safety standards.

In another approach for improving or maximizing the visibility of a structured light pattern, a special optical filter is placed on the imager so as to allow only the frequency of light produced by the pattern illumination source. This will block out a relatively large portion of the light produced by other sources, which makes the pattern illumination source relatively clearly visible in the image. Typically, the use of such a filter produces an image in which the only visible element is the illumination pattern. The use of such a filter, however, precludes the use of the imager for other purposes for which other frequencies of light are necessary.

In another approach for improving or maximizing the visibility of a structured light pattern, the pattern illumination source can be flashed on very intensely for a very short period of time (typically tens of milliseconds or less). Concurrently, the imager is synchronized with the illumination source so as to collect light to form an image only during the short interval during which the light source is on. This method produces an image where the illumination pattern is clearly visible (again, typically the pattern is the only thing registered in the image), because during the time the illumination is on, it is of much higher intensity than any other source. However, once again, this method precludes the use of the imager for other purposes for which other frequencies of light are necessary.

In yet another approach for improving or maximizing the visibility of a structured light pattern, the detectability of the pattern can be enhanced by taking two images in rapid succession, one with the pattern source on and another with the pattern source off, and detecting the pattern in the difference of the two images. If the two images are taken in sufficiently rapid succession, then, presumably, the environment, which includes other light sources, has not changed, and so the illumination pattern should be easily detectable as the only difference between the two images. This method enables detection of the pattern with a much weaker illumination source than the other methods. However, it works effectively only if there is neither motion of the imager nor motion of anything else in the environment. Any moving object (or apparent moving environment if the imager itself is moving) will register in the difference of images, making it relatively difficult to detect the illumination pattern. Furthermore, many indoor lighting sources connected to alternating current sources experience power flicker (in the case of fluorescent lights) or fluctuate (in the case of incandescent lights), typically at 50 Hz or 60 Hz, which also violates the assumption that nothing but the pattern illumination source varies between the two acquired images.

SUMMARY

The methods and systems for obstacle detection disclosed herein use the structured light approach, in which novel methods and systems for light detection and for sensor placement enable the robust detection of obstacles in applications where other methods would either not be permitted (due to eye safety restrictions), or would not function satisfactorily.

In one embodiment, the method and system allow detection of a potential collision with any part of the forward-looking profile of the mobile device. The method and system also do not require the use of a dedicated imager that is specifically configured for obstacle detection and cannot be used for any other purpose. Instead, the method and system permits the concurrent use of the imager for other purposes, such as object recognition, object tracking, or video streaming for surveillance, tele-operation, or video-conferencing.

In one embodiment, the method comprises flashing a laser or LED on and off; synchronizing the laser with an imager; using a persistence model to enhance laser signal and remove other sources; optionally, using a pseudo-random sequence to further suppress the effects of other light sources; optionally, triangulating detected point's 3-D position; and, optionally, deploying multiple light sources to fully cover the device's profile.

In one embodiment, the method comprises flashing a laser or LED on and off; synchronizing the laser or LED with an imager; using an optical bandpass filter in the imager to enhance the laser signal and suppress other light sources and background; using a persistence model to further enhance the laser signal and remove other sources; optionally, using a pseudo-random sequence to further suppress the effects of other light sources; and optionally, deploying multiple light sources to fully cover the device's profile.

In one embodiment, the method comprises any of the systems or methods described herein together with a tilt sensor or similar measuring device to estimate the robot and sensor orientation; and using the sensor orientation information to differentiate between genuine obstacles and the obstruction of field of view due to the robot tilt.

In one embodiment, the invention features an obstacle detector for use in a mobile robot, for example. The detector includes: at least one pulsed light source configured to project light in the path of the robot; a visual sensor for capturing images including a subset of images showing the light reflected from the floor or obstacle; a microprocessor or equivalent processing unit configured to subtract or difference pairs of images to extract the reflected light and to add or otherwise combine two or more pairs of images after subtraction to average out and suppress the background. With this technique, obstacle detection may be implemented while the robot is in motion without the need to stop.

The light source can be any of a number of devices including laser and light emitting diodes. The beam of light generated by the source is generally pulsed in a repetitious on and off sequence or in accordance with a pseudo-random code. The structured light projected by the light source on the path before the robot may include focused points of light or lines of light arrayed horizontally, vertically, or both. Based on the location of the reflected light in the combined images, the processing unit can use triangulation, for example, to determine the position and/or height of the reflection and distinguish between the floor and an obstacle in the robot's path. In some embodiments, the obstacle detector further includes a tilt sensor configured to determine the orientation of the robots to further enhance the accuracy of the obstacle detector.

In some embodiments, the invention features a method for detecting an obstacle, comprising: repeatedly pulsing at least one light source on and off in accordance with a determined sequence; capturing a plurality of images of light reflected from the path of the robot; generating two or more difference images by subtracting pairs of the plurality of images where each pair of images comprising a first image with the at least one light source on and a second image with the light source off; combining two or more difference images to enhance the reflected light relative to the background; and detecting the obstacle in the path of the robot based on a location of the reflected light in the combined difference images. The method may also determine the location of the reflected light in the combined difference images is determined by triangulation.

In some additional embodiments, the invention features an obstacle detector comprising: at least one light source configured to project light pulsed in a determined sequence; a visual sensor for capturing a plurality of images comprising reflections of the projected light; a processing unit configured to subtract pairs of images captured with the at least one light source to extract the reflections, each pair comprising a first image captured with the at least one light source on and a second image captured with the at least one light source off; a tilt sensor configured to determine an orientation of the robot; and an obstacle detection unit configured to detect an obstacle in the path of the robot based on the determined orientation and the reflections in the pairs of images after subtraction.

BRIEF DESCRIPTION OF THE DRAWINGS

Features of the system and method will be described with reference to the drawing summarized below. This drawing (not to scale) and the associated description are provided to illustrate embodiments of the system and method and are not intended to limit the scope of the system or the system or method.

DETAILED DESCRIPTION OF PREFERRED EMBODIMENTS

Figure 1:
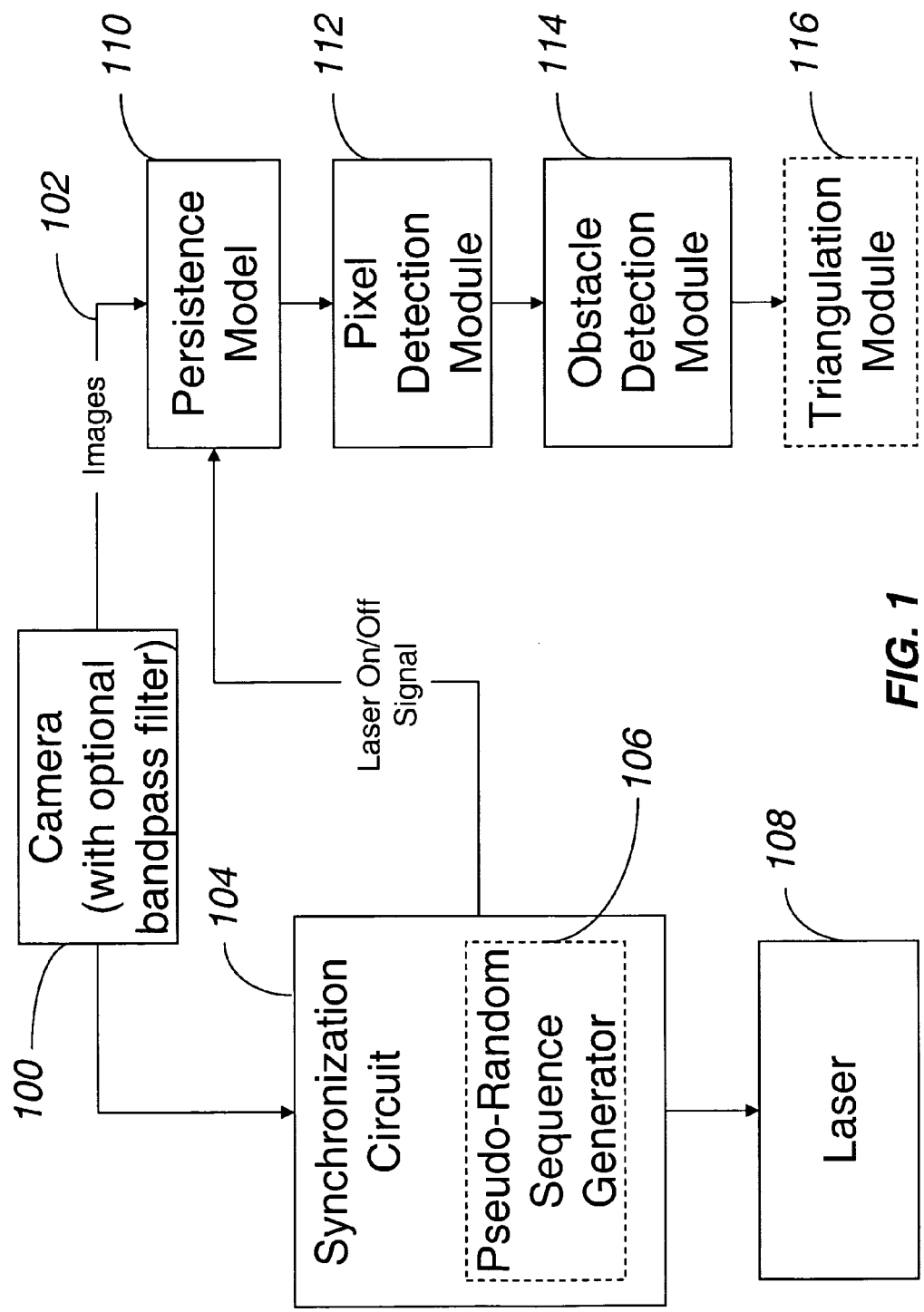
FIG. 1 is a block diagram illustrating one embodiment of the system present invention.

FIG. 1 illustrates a block diagram for one embodiment of the invention. The system includes a visual sensor 100 optionally equipped with a narrow bandpass interference filter matching the frequency of the lasers 108. A synchronization circuit 104 receives a synchronization signal from a visual sensor 100 and sequentially pulses a laser 108 on and off. Optionally, the synchronization circuit 104 includes a pseudo-random sequence generator 106. A stream of images 102 acquired from the visual sensor 100 is sent to a persistence model module 110, which combines the information from the stream of images 102. A pixel detection module 112 determines which pixels in the images 102 are illuminated by light from the laser 108, namely the light reflected from the path of the robot. An obstacle detection module 114 then decides whether the illuminated pixels correspond to one or more obstacles or do not correspond to an obstacle. For example, in one embodiment, if the obstacle detection module 114 determines that an illuminated pixel corresponds to a floor surface, then the obstacle detection module determines that the illuminated pixel does not correspond to an obstacle. An optional triangulation module 116 computes the 3-D position of the obstacle point with respect to a reference frame associated with a device, such as a robot, that carries the visual sensor 100. The synchronization circuit 104, the persistence model 110 the pixel detection module 112, the obstacle detection module 114, and the triangulation module 116 are discussed in greater detail below.

Figure 3:
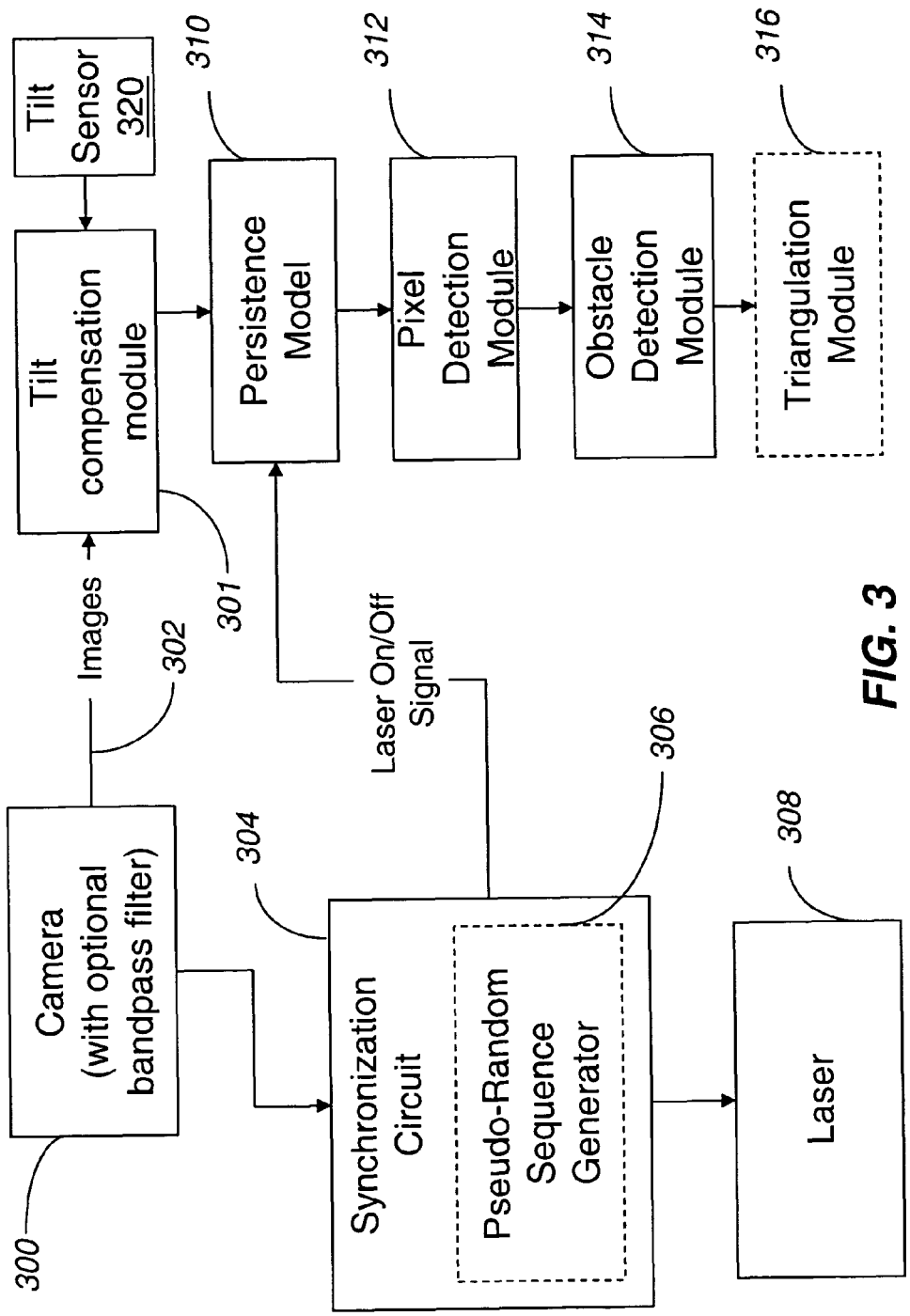
FIG. 3 is a block diagram illustrating one embodiment of the system present invention.

FIG. 3 illustrates a block diagram for another embodiment of the invention. The robot preferably includes a visual sensor 300 optionally equipped with narrow bandpass interference filter matching to the frequency of the lasers. A synchronization circuit 304 receives a synchronization signal from a visual sensor 300 and alternately pulses a laser 308 on and off. Optionally, the synchronization circuit 304 includes a pseudo-random sequence generator 306. A stream of images 302 acquired from the visual sensor 300 is sent to a tilt compensation module 301 which applies the information from the tilt sensor 320 to the stream of images. The tilt-compensated stream of images is than forwarded to the persistence model 310, which combines the information from the stream of images. A pixel detection module 312 determines which pixels in the images 302 are illuminated by light from the laser 308. An obstacle detection module 314 then decides whether or not the illuminated pixels correspond to one or more obstacles. An optional triangulation module 316 computes the 3-D position of the obstacle point with respect to a reference frame associated with a device, such as a robot, that carries the visual sensor 300. The synchronization circuit 304, the tilt compensation module 301, the persistence model 310, the pixel detection module 312, the obstacle detection module 314 and the triangulation module 316 are discussed in greater detail below.

Figure 5:
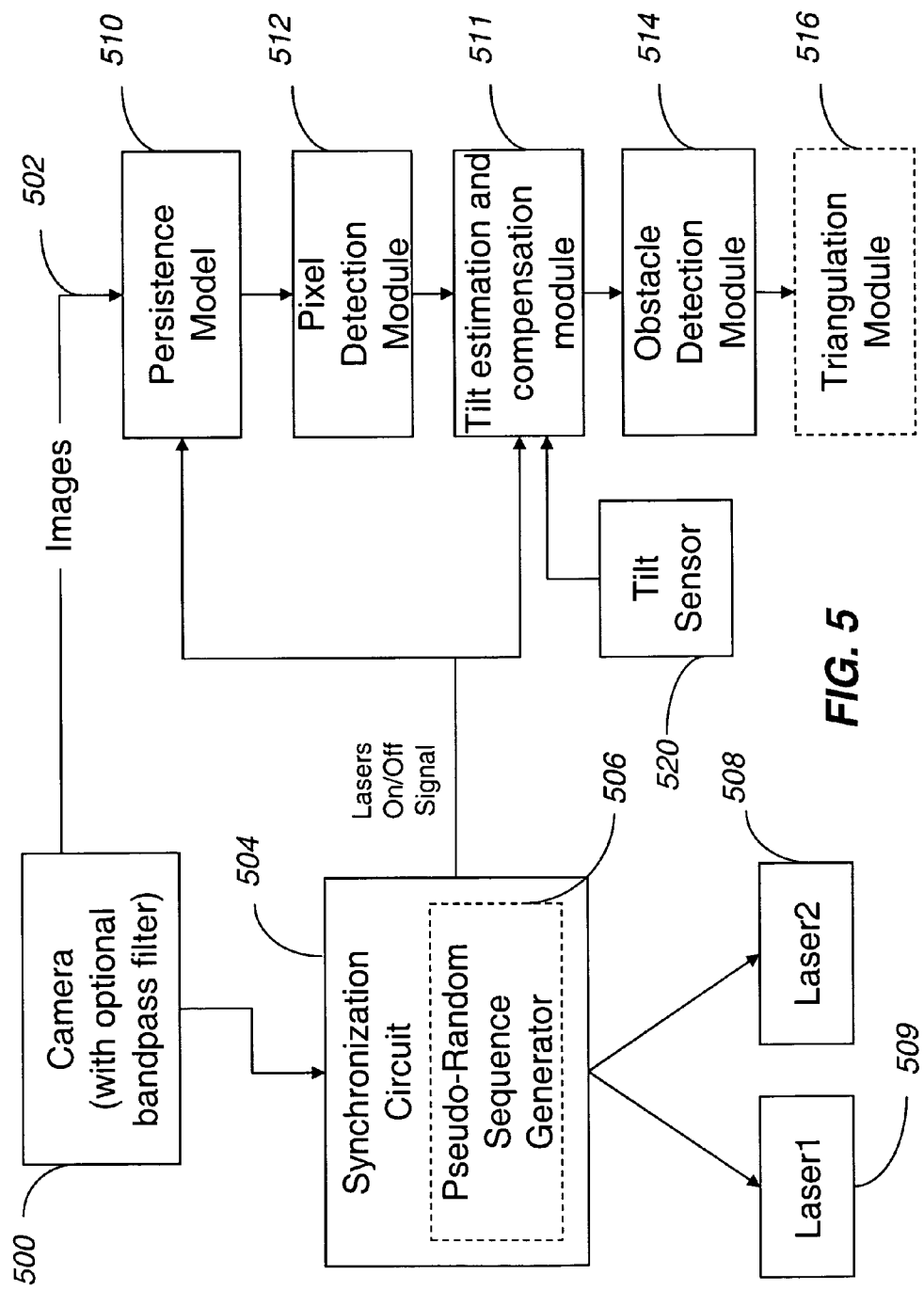
FIG. 5 is a block diagram illustrating one embodiment of the system present invention.

FIG. 5 illustrates a block diagram for another embodiment of the invention. The robot preferably includes a visual sensor 500 optionally equipped with narrow bandpass interference filter matching to the frequency of the lasers. A synchronization circuit 504 receives a synchronization signal from a visual sensor 500 and alternately pulses the lasers 508 and 509 on and off. Optionally, the synchronization circuit 504 includes a pseudo-random sequence generator 506. A stream of images 502 acquired from the visual sensor 500 is sent to the persistence model 510, which combines the information from the stream of images. A pixel detection module 512 determines which pixels in the images 502 are illuminated by light from the lasers 508 and 509. The tilt compensation module 511 determines if the robot system is tilted based on the known geometry of lasers 508, 509, and the visual sensor 500, and the tilt sensor 520. An obstacle detection module 514 then decides whether or not the illuminated pixels correspond to one or more obstacles. For example, in one embodiment, if the obstacle detection module 514 determines that an illuminated pixel corresponds to a floor surface, then the obstacle detection module determines that the illuminated pixel does not correspond to an obstacle. An optional triangulation module 516 computes the 3-D position of the obstacle point with respect to a reference frame associated with a device, such as a robot, that carries the visual sensor 500. The synchronization circuit 504, the tilt compensation module 511, the persistence model 510, the pixel detection module 512, the obstacle detection module 514 and the triangulation module 516 are discussed in greater below.

System Tilt Estimation and Compensation

In order for the obstacle detection module to decide if the illuminated pixels correspond to the floor surface or not it needs to know the system position and orientation relative to the floor surface. The system position (height from the floor and initial orientation) are usually fixed at the time of design of mobile platform. However during operation, the mobile platform may tilt when passing over a floor surface that is warped or includes small objects thereon. The tilt of the robot causes a shift in and rotation of the theoretical area of the image corresponding to the illuminated pixels on the floor surface. Without knowing the system tilt, a false positive detection of an obstacle is more likely.

Figure 2:
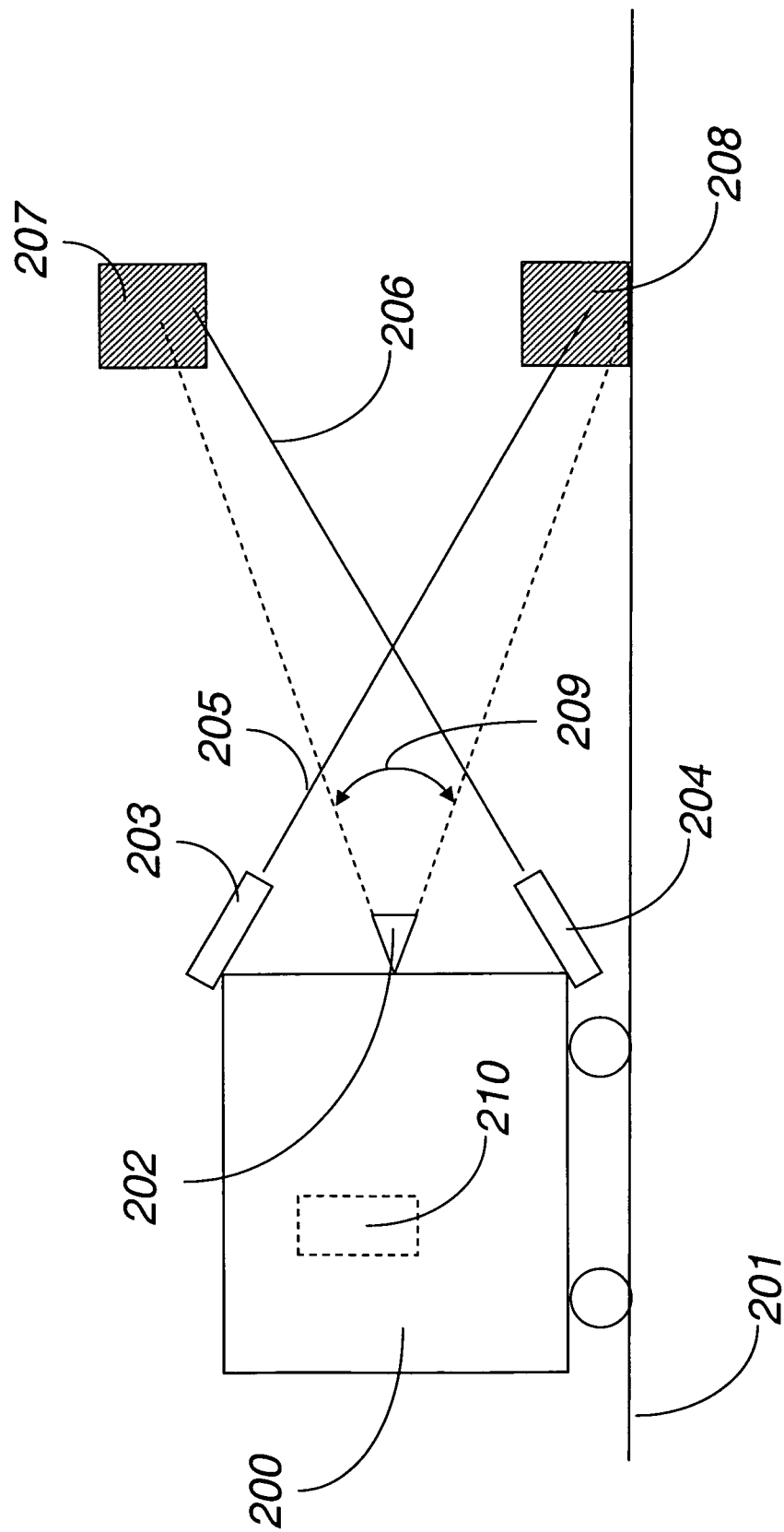
FIG. 2 is a schematic representation of one embodiment of a robot system of the present invention.
Figure 4:
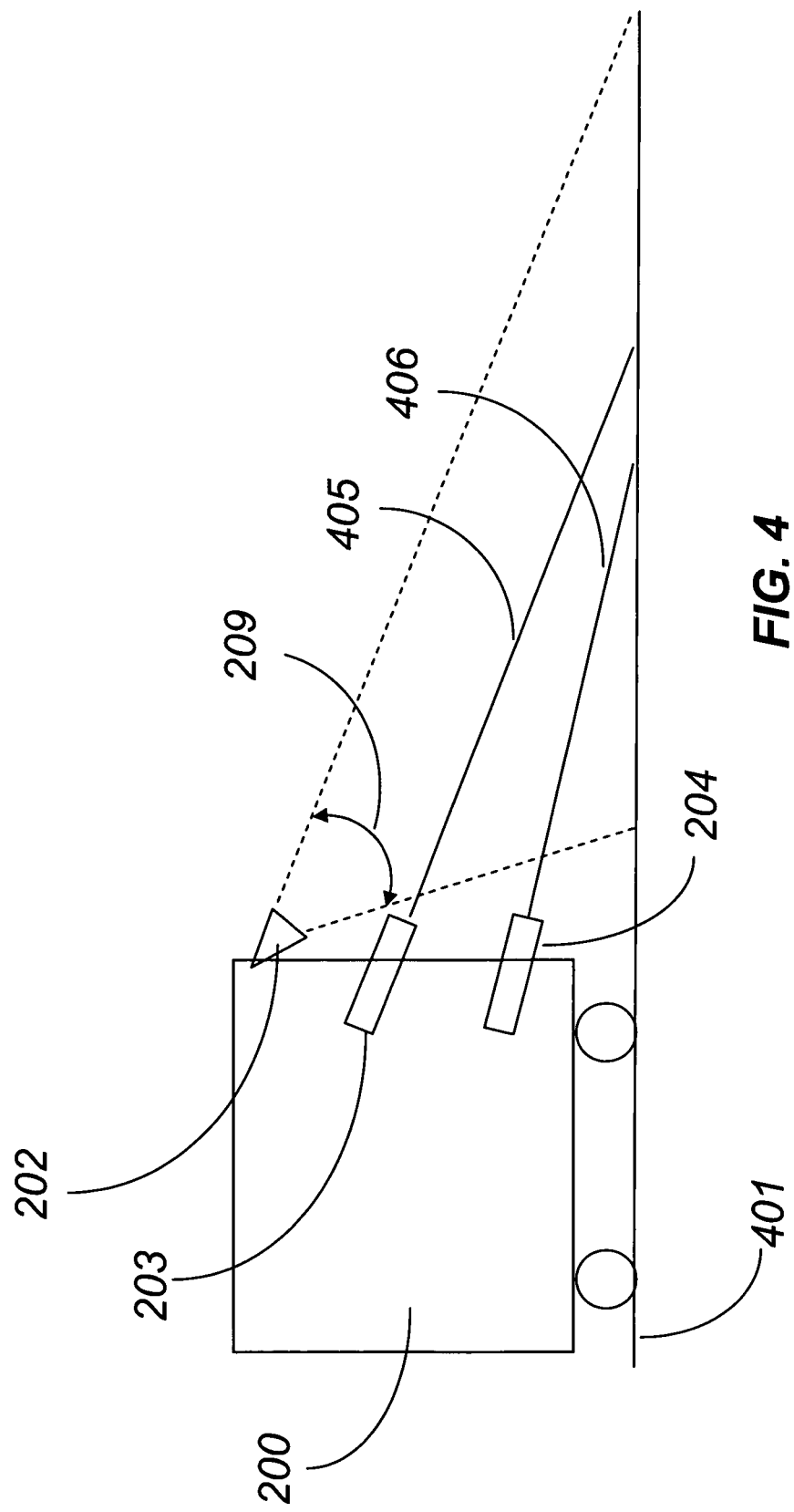
FIG. 4 is a schematic representation of one embodiment of the robot system of the present invention.

One embodiment of the tilt estimation illustrated in FIG. 2 comprises a dedicated tilt sensor 210 (encoder or accelerometer based, for example) which provides the orientation angle relative to the vector of earth gravity to the tilt compensation module. Another embodiment illustrated on FIG. 4 utilizes two parallel laser line segments or strips 405 and 406 projected on the floor surface 401 at a different angle. By analyzing the distance and angle between the two strips in the image it's possible to estimate the tilt of the system. This method may be more economical but can result in a false tilt detection where the obstacle is in a crowded environment passing over an uneven floor surface.

Synchronization Circuitry

In order to effectively build up a persistence model of the environment being scanned, the laser light must be alternately turned of and on in sync with the camera's electronic shutter, and the information as to whether the laser light was on or off for each acquired image frame must be passed to the persistence model. Depending on the actual hardware used, there are several methods to achieve synchronization. For example, some cameras come equipped with a sync in and sync out signal, which enable, respectively, the camera to receive a synchronization signal to control it's electronic shutter, or to provide other devices with a sync signal. Even if such signals are not available, as may be the case with less expensive cameras, such as USB webcams, there is still within the camera control circuitry a pin which is the vertical sync signal, from which a sync signal can be derived.

One embodiment of the synchronization circuitry comprises a microcontroller which receives a sync signal from the camera, counts the sync pulses, and outputs a control signal to a power mosfet to pulse the laser on for the appropriate amount of time on every even frame. Alternatively, a more sophisticated sequence of laser on/off pulses can be generated by the microcontroller to reduce the interference from extraneous periodic sources (as will be described in more detail below).

There are also various ways that the synchronization circuitry can communicate to the persistence model whether or not the laser was on or off for each acquired frame. One method involves indicating the state of the laser on a digital i/o line which the CPU running the persistence model can read. Another method comprises the synchronization microcontroller simulating the pressing of the 'snapshot' button of the camera (if one exists, such as on the Logitech 4000 webcam) whenever the laser is on, and this information is passed to the CPU running the persistence model as part of the camera image data.

Persistence Modeling of Frames

A persistence model of frames is a linear combination of images that attempts to maximize the correlated persistence of a laser on an object, but minimize uncorrelated background movement artifacts. A set of n frames can be denoted by $\{f_1, f_2, \ldots, f_n\}$.

In one embodiment, a frame $f_i$ is represented by a matrix of grayscale pixel values. The dimensions of the matrix correspond to the dimensions, in pixels, of the image received from a visual sensor. The visual sensor can receive multiple channels of data, such as RGB color data, and use a model or math filter to convert the multiple-channel image to a single-channel image, such as a grayscale image. In one embodiment, the model or filter attempts to extract the "laser on" pixels from the "laser off" pixels. If multiple channels are used, the filter can be used to differentiate among several laser wavelengths, even if multiple wavelengths appear in the same image. For example, in one implementation, a first laser wavelength is used to detect obstacles that are relatively low to the floor surface, and a second laser wavelength is used to detect obstacles that are relatively high off the floor surface. In one embodiment, the filter performs a weighted addition of the channels, wherein each channel's weighting is proportional to the relative intensity of the laser's wavelength as detected by the channel. One embodiment of the filter performs a median filter using some window size, such as 5 pixels by 5 pixels or 7 pixels by 7 pixels. More complex filters can be used to account for the point-spread pattern of the laser, which may, for example, correspond to a dot, a line, or a Gaussian distribution. The resulting filtered frame corresponds to the intensity of the filtered laser light in the image.

A persistence model $d_n$ associated with the set of frames $\{f_1, f_2, \ldots, f_n\}$ can be expressed in the form given by Equation 1.

$$d_n = \sum_{i=1}^{n} c_i f_i \qquad \text{Equation 1}$$

In Equation 1, the constants $c_1, c_2, \ldots, c_n$ are called the "persistence scalers" associated with the frames $f_1, f_2, \ldots, f_n$.

One problem with frame differencing alone (that may exist in the prior art) is that even small motion can cause very bright artifacts near the edge of high contrast object. These artifacts are difficult to distinguish from the structured laser light. One possible method to avoid this is to model not just the instantaneous difference between frames, $f_{2n} - f_{2n-1}$, but rather a more complex combination of past frames $f_i$, as given in Equation 2.

$$d_{2n} = \sum_{i=1}^{n} (a_{2i} f_{2i} - a_{2i-1} f_{2i-1}) \qquad \text{Equation 2}$$

Different persistence models can be created using Equation 2 by choosing different values for the constants $a_1, a_2, \ldots, a_{2n}$. Each constant $a_i$ is known as a "frame difference persistence scaler" associated with the frame $f_i$.

One example of a model for persistence is an exponential decay model. This model is based on the idea that for most cases, the laser projected onto an object will remain in approximately the same place for a time scale of a certain number of frames. At the same time, the probability of a high-contrast edge motion artifact occupying the same pixel region over multiple difference frames (other than oscillation, which is discussed in greater detail below in the context of periodic error) is relatively unlikely and should decrease with time.

In one embodiment, the model assumes independence of persistence probabilities between frames for a given occupied pixel region. For each difference frame, a pixel region being illuminated by laser light reflected by an obstacle has probability p of having been illuminated in the previous difference frame. The assumption of implies that the probability of the region being illuminated for k consecutive difference frames will then be $p^k$. Then, given that a pixel region is illuminated in the nth difference frame, the probability that the pixel region is also illuminated in the ith difference frame, where i<n, is given by the expression shown in Equation 3.

$$P(r_i | r_n) = p^{n-i} \qquad \text{Equation 3}$$

Equation 3 implies that $a_i = p^{n-i}$ can be used as the frame difference persistence scalers, and, thus, the frame differencing relationship discussed earlier in connection with Equation 2 can be written as follows in Equation 4.

$$d_{2n} = \sum_{i=1}^{n} (p^{2n-2i} f_{2i} - p^{2n-2i+1} f_{2i-1}) \qquad \text{Equation 4}$$

In one embodiment, the choice of p depends on the persistence probability of real world obstacles and should be determined through experimentation, such as robot navigation testing with a laser and likely obstacles. It is possible, however, to estimate a relatively likely bound on p through experimentation. The bound on p can, for example depend on characteristics of the system such as the robot's typical velocity, the width of the laser, and the resolution of the visual sensor.

One benefits of the exponential decay model is its relative computational simplicity. It is not only a relatively simple probability model, but it can also be computed using a relatively fast inductive algorithm. Advantageously, exponentials need not be computed, and floating point math need not be used. These features represent an important design advantage for streaming video and real-time obstacle detection applications.

Equation 4 can be rewritten in the following form.

$$d_{2n} = f_{2n} - pf_{2n} + p^2 \left( \sum_{i=1}^{n-1} p^{2n-2i} f_{2i} - \sum_{i=1}^{n-1} p^{2n-2i+1} f_{2i-1} \right) \qquad \text{Equation 5}$$
$$= f_{2n} - p(f_{2n-1} - pd_{2n-2})$$

If p is taken to be a rational number that can be expressed in the form $p = m/2^N$, where m and N are integers, the iterative algorithm shown in Equation 5 can be computed relatively quickly, using only integer math (multiplies and shifts).

Periodic Noise Reduction

One potential source of false frame differencing signals is periodic sources of light. Because most CCDs operate at 30 frames per second, frame differencing will be sensitive to light sources that flicker at 15 Hz or at a whole-number multiple of 15 Hz, such as 30 Hz, 45 Hz, 60 Hz, and so forth. Computer monitors, TV remote controls, and electric lights are examples of devices that flicker at these rates and therefore may cause problems. For example, the system may mistakenly identify signals as laser signals. Periodic patterns combined with constant device motion, as experienced when a device moves along a floor that has a regular pattern of tiles, can also cause periodic error.

One way to filter out periodic error is to use a more complex pattern of on/off frames rather than the standard even/odd method. One embodiment employs a long bit sequence that determines if a particular frame should be added or subtracted. One example of an appropriate bit sequence is a sequence formed by repeating a sub-sequence multiple times. For example, a sub-sequence $\{b_1, b_2, \ldots, b_m\}$ that is m bits long can be repeated to form a longer sequence $\{b_1, b_2, \ldots, b_m, b_1, b_2, \ldots, b_m, b_1, b_2, \ldots, b_m, \ldots\}$. It will be understood that the sub-sequence can be repeated as necessary until each frame of interest is associated with a sequence element. Thus, because the sequence repeats every m terms, the terms of the sub-sequence, denoted herein by $\{b_{i \bmod m}\}$, constitute a complete sub-sequence for $i = 1, 2, \ldots, m$. In the example illustrated earlier in connection with Equation 2, Equation 3, Equation 4, and Equation 5, the sub-sequence $\{b_{i \bmod m}\}$ corresponds to $\{b_{i \bmod 2}\} = \{1, 2\}$. However, other appropriate sub-sequences sequences will be readily determined by one of ordinary skill in the art. Then, $d_n$ can be computed according to the Equation 6.

$$d_n = \sum_{i=1}^{n} (-1)^{b_{i \bmod m}} p^{n-i} f_i \qquad \text{Equation 6}$$

Detecting Illuminated Pixels

Given the current persistence model $d_n$, several methods can be used to determine the pixel locations at which the laser light is detected. In one embodiment, a decision can be made on a pixel-by-pixel basis in the following manner. Each pixel value is compared to a threshold, and if the pixel value exceeds the threshold, the laser light is deemed to be present at the location represented by the corresponding pixel. An appropriate threshold can be selected to maximize the probability of recognizing the laser correctly, and an appropriate threshold can depend on the robot's typical velocity, ambient lighting conditions, reflectivity of the observed surfaces, and the effectiveness of the filter that filters images from the visual sensor. In another embodiment, the persistence model is analyzed on a block-by-block basis. An appropriate block size can be selected using characteristics of the system such as the visual sensor resolution and the desired resolution of obstacle detection. This method tends to increase the method's robustness to outliers. Yet another embodiment considers the epipolar constraint of the beam of light. For each epipolar ray, the method selects, at most, one pixel that is most likely to be illuminated. This embodiment is based on the fact that, if transparent objects are disregarded, a thin beam of light illuminates only one location. Thus, within the locus of possible beam locations (the epipolar ray), there is, at most, only one location at which the beam is actually detected.

Detecting Obstacles

For each image coordinate at which the light pattern is detected, one can determine whether or not it corresponds to an obstacle. This computation can be done in several ways. One embodiment uses an accurate calibration of the relative poses of the imager and the light source and then triangulates the observed image coordinates to compute a position in 3-D space. In one implementation, these positions from multiple frames in sequence are used to reconstruct obstacles in a more robust fashion. Another embodiment avoids the requirement of an accurate relative pose calibration, and, rather than estimating the 3-D position of the detected image point, distinguishes whether or not the point corresponds to an obstacle. This section describes how such computations are performed for an embodiment in which the structured light is a laser stripe.

An observed light point can be classified as either corresponding to an obstacle or not corresponding to an obstacle. This classification can be done based at least in part on the image coordinates associated with the observed light point. Points that correspond to the floor plane lie within a particular region of the image, and points that correspond to an object at a height higher or lower than the floor plane will lie in other regions of the image. For example, if the light source is a laser stripe, and the laser stripe is observed on the floor, then it will be observed on the image as a particular line segment. If the mobile device moves so that laser stripe no longer hits the floor but rather an obstacle, then the laser light is detected in the image no longer on the floor's line segment, but rather above it or below it. Whether the detection occurs above or below the floor line depends on the configuration of the visual sensor and light source. Thus, to determine whether or not an object is present, it is sufficient to determine whether or not the detected light point corresponds to the floor line segment or not. If one also has information relating to the relative position of the imager and light source, one can further determine whether the obstacle is above or below the floor plane. Examples of obstacles that can lie below the floor plane include depressions, holes, stairs, and the like.

An obstacle is defined as an observed light point not corresponding to the floor plane. However in case of the robot tilt over small objects on the floor (like wires, books, small toys, doorways) the region of the image corresponding to the floor plane will shift and/or rotate. It can cause an undesirable false-positive detection of an obstacle. One embodiment uses a tilt sensor to measure the robot pose to re-adjust the region of the image corresponding to the floor plane.

If an accurate calibration of the relative pose of the imager and light source is known, one can compute the 3-D position in space of the obstacle with respect to the mobile device. This can provide additional functionality, namely, one can decide whether the object is large enough to be of concern. In particular, if the object is very small, it can be safe to move over it. It can also be possible to maintain a 3-D map (or 2-D map by projecting onto the floor plane) of the locations of obstacles, so that the mobile device reacts not only to detections from the current image, but also to information from the past. One way to compute a 3-D location corresponding to the detected image point is to use the procedure discussed below in connection with Equation 7 and Equation 8.

$$x_p = \frac{1}{f}(x_d - t) \qquad \text{Equation 7}$$

In Equation 7, $x_d$ corresponds to the coordinates of the detected image point, and $x_p$ corresponds to the corresponding coordinates of the detected image point in the ideal perspective projection plane. $x_p$ can be obtained from $x_d$ by using the focal length f and the optical axis vector t of the imager. In one embodiment, $x_d$, $x_p$, and t are represented by 2-element vectors that correspond to coordinates in an (x, y) plane.

More sophisticated formulas can be used to take into account lens distortion factors, which can be necessary to incorporate for images with lenses with significant distortion, such as a wide angle lens. For example, if x is represented with the homogeneous coordinates of the perspective projection point $x_p$, (i.e., make $x_p$ a 3-dimensional vector by appending a 1 to it as a third coordinate), then x represents the line from the imager focal point to the 3-D location of the detected obstacle. The intersection of this line with the plane of light emanating from the light source determines the 3-D location of the obstacle. The intersection point, X, of x with the light plane is computed using Equation 8.

$$X = \frac{p_l \cdot n_l}{x \cdot n_l} x \qquad \text{Equation 8}$$

In Equation 8, $n_l$ corresponds to the 3-D vector defining the normal to the laser light plane, and $p_l$ corresponds to a point on the laser light plane, defined with respect to the visual sensor's reference frame. The symbol "·" denotes the vector dot product operation. X is thus the 3-D coordinate of the detected obstacle in the visual sensor's reference frame. If the coordinate with respect to the mobile device's reference frame is desired, it can be computed by applying the appropriate coordinate transformation, assuming that the visual sensor's position relative to the mobile device's reference frame is known.

Covering Entire Device Profile

With a single laser stripe, it can be relatively difficult to guarantee detection of all objects that may collide with a mobile device of a given height. For example, a single laser stripe aimed at a floor surface should enable the detection of an obstacle near the ground, but it is relatively unlikely to detect an overhanging obstacle, such as a seat of a chair or a tabletop of a coffee table. To cover the full forward-facing profile of the mobile device, multiple laser stripes can be used.

FIG. 2 illustrates a configuration of the system in which two laser stripes can provide coverage of the full forward-facing profile of a mobile device. A robot 200 is supported by a floor surface 201. A visual sensor 202 having a field of view 209 is coupled to the robot 200. The robot 200 is equipped with a first stripe-producing laser 203 and a second stripe-producing laser 204. The first laser 203 is located approximately at the top of the robot 200 and emits a first beam 205 that is directed in a generally downward direction. The second laser 204 is located approximately at the bottom of the robot 100 and emits a second beam 206 directed in a generally upward direction. When the first beam 205 and/or the second beam 206 intersects an obstacle that lies within the field of view 209 of the visual sensor 202, the robot 200 can detect the obstacle. As FIG. 1 illustrates, the robot 200 can detect a first obstacle 207 that lies in the path of the top portion of the robot 200 because the beam 206 intersects the obstacle 207 within the field of view 209 of the visual sensor 202. Furthermore, the robot can detect a second obstacle 208 that lies in the path of the bottom portion of the robot 200 because the beam 205 intersects the obstacle 208 within the field of view 209 of the visual sensor 202. In this fashion, the robot 200 obtains obstacle detection covering its full forward-facing profile.

Various embodiments of the system and method have been described above. Although this system and method have been described with reference to these specific embodiments, the descriptions are intended to be illustrative of the system and method and are not intended to be limiting. Various modifications and applications may occur to those skilled in the art without departing from the true spirit and scope of the system or the method.

We claim:

1. An obstacle detector for a mobile robot, the detector comprising:
   at least one light source configured to project light in a path of the robot wherein light projected in the path of the robot has structure, and
      wherein the light source is pulsed in a determined sequence;
   a visual sensor for capturing a plurality of images comprising reflections of the projected light, wherein at least a portion of the plurality of images are captured by the visual sensor while the robot is in motion;
   a processing unit for detecting reflections, wherein the processing unit is configured to:
      generate at least two difference images from a first plurality of image pairs, a given image pair in the first plurality of images pairs comprising a first image captured with the at least one light source on and a second image captured with the at least one light source off; and
      mathematically generate at least one filtered image to suppress movement artifacts, based at least in part on at least two difference images generated from respective pairs of images captured by the visual sensor;
compare pixels of the at least one filtered image to a threshold value to detect reflections from the light source;
a tilt sensor, included in the robot, configured to sense a tilt of the robot caused by a floor surface over which wheels of the robot are traversing;
wherein the tilt sensor included in the robot is configured to determine an orientation of the robot with respect to at least the floor surface the wheels of robot are traversing; and
an obstacle detection unit configured to detect an object in the filtered image and determine whether the object is an obstacle or is the surface the robot is traversing based on the detected reflections from the at least one filtered image, wherein the obstacle detection unit is configured to apply tilt compensation with respect to one or more images, comprising one or more images of reflected light, based at least in part on information from the tilt sensor to facilitate determination as to whether the object is an obstacle or is the surface the robot is traversing.

2. The obstacle detector of claim 1, wherein the at least one light source comprises at least one laser.

3. The obstacle detector of claim 1, wherein the at least one light source comprises at least one light emitting diode (LED).

4. The obstacle detector of claim 1, wherein the light projected in the path of the robot comprises one or more line segments.

5. The obstacle detector of claim 1, wherein the light projected in the path of the robot comprises one or more points of focused light.

6. The obstacle detector of claim 1, wherein the obstacle detection unit is configured to detect an obstacle in the path of the robot further based on the orientation of the robot.

7. The obstacle detector of claim 1, wherein, the determined sequence is a pseudo-random sequence.

8. The obstacle detector of claim 1, wherein the visual sensor is a video camera.

9. The obstacle detector of claim 8, wherein the video camera and the at least one light source are synchronized.

10. The obstacle detector of claim 1, wherein the plurality of images are captured by the visual sensor while the robot is in motion.

11. The obstacle detector of claim 1, wherein the processing unit is further configured to weight each of the plurality of images with a frame difference persistence scalar prior to generating associated difference images.

12. The obstacle detector of claim 11, wherein a value of each frame difference persistence scalar is selected based on an exponential decay model.

13. The obstacle detector of claim 1, wherein the threshold is based at least in part on one or more of:
robot velocity information,
ambient lighting conditions, or
reflectivity of observed surfaces.

14. The obstacle detector of claim 1, wherein the tilt sensor is configured to sense an uneven condition on the surface the robot is traversing.

15. The obstacle detector of claim 1, wherein the obstacle detector is configured to apply tilt compensation, with respect to the one or more images, to adjust a region in at least one of the one or more images corresponding to a floor plane based at least in part on information from the tilt sensor.

16. The obstacle detector of claim 1, wherein the plurality of images are captured by the visual sensor while the robot is in motion.

17. The obstacle detector of claim 1, wherein the tilt sensor, included in the robot, is configured to sense a tilt of the robot caused by the robot traversing floor surface warp or objects on the floor surface.

18. A method of detecting obstacles in a path of a robot, the method comprising:
repeatedly pulsing at least one light source on and off in accordance with a determined sequence;
capturing a plurality of images of light reflected from the path of the robot, wherein at least a portion of the plurality of images are captured by a sensor while the robot is in motion;
generating, by at least one processing unit, two or more difference images by subtracting pairs of the plurality of images, wherein a given pair of images in the plurality of images comprises a first image with the at least one light source on and a second image with the light source off;
mathematically generating, by at least one processing unit, at least one filtered image to suppress movement artifacts, based at least in part on at least two difference images generated from respective pairs of images captured by the visual sensor;
comparing pixels of the at least one filtered image to a threshold value to detect reflections from the light source;
detecting an object based on a location of the detected reflections from the light source in the filtered images;
receiving tilt information from a tilt sensor included in the robot, the tilt information indicating an orientation of the robot with respect to at least a surface the robot is traversing, the tilt sensor configured to sense a tilt of the robot caused by a floor surface over which wheels of the robot are traversing;
applying tilt compensation with respect to one or more images, comprising one or more images of reflected light, based at least in part on information from the tilt sensor to facilitate determination as to whether the object is an obstacle or is the surface the robot is traversing.

19. The method of claim 18, wherein detecting an object comprises determining a position of a surface from which the reflected light is received.

20. The method of claim 19, wherein determining the position of the surface from which the reflected light is received comprises triangulating the position based on the location of the reflected light in the at least one filtered image.

21. The method of claim 18, wherein the threshold is based at least in part on one or more of:
robot velocity information,
ambient lighting conditions, or
reflectivity of observed surfaces.

22. The method of claim 18, wherein the tilt sensor is configured to sense an uneven condition on the surface the robot is traversing.

23. The method of claim 18, the method further comprising adjusting a region in at least one of the one or more images corresponding to a floor plane based at least in part on information from the tilt sensor.

24. The method of claim 18, wherein the tilt sensor, included in the robot, is configured to sense a tilt of the robot caused by the robot traversing floor surface warp or objects on the floor surface.

* * * * *

UNITED STATES PATENT AND TRADEMARK OFFICE
CERTIFICATE OF CORRECTION

| | | |
|---|---|---|
| PATENT NO. | : 9,002,511 B1 | Page 1 of 1 |
| APPLICATION NO. | : 11/584355 | |
| DATED | : April 7, 2015 | |
| INVENTOR(S) | : Kevin Hickerson | |

It is certified that error appears in the above-identified patent and that said Letters Patent is hereby corrected as shown below:

In The Specification

In column 7 at line 18, Change "of" to --off--.

In The Claims

In column 13 at line 38, In Claim 7, change "wherein," to --wherein--.

Signed and Sealed this
Fifteenth Day of December, 2015

Michelle K. Lee
*Director of the United States Patent and Trademark Office*